United States Patent
Grieve et al.

(10) Patent No.: US 7,025,875 B2
(45) Date of Patent: Apr. 11, 2006

(54) DIESEL FUEL REFORMING STRATEGY

(75) Inventors: M. James Grieve, Fairport, NY (US); Christopher M. DeMinco, Honeoye Falls, NY (US); Thomas R. Thoreson, Brighton, MI (US)

(73) Assignee: Delphi Technologies, Inc., Troy, MI (US)

( * ) Notice: Subject to any disclaimer, the term of this patent is extended or adjusted under 35 U.S.C. 154(b) by 365 days.

(21) Appl. No.: 09/854,611

(22) Filed: May 14, 2001

(65) Prior Publication Data

US 2002/0168557 A1 Nov. 14, 2002

(51) Int. Cl.
*C10G 7/00* (2006.01)

(52) U.S. Cl. ............... 208/208 R; 208/244; 208/347; 423/650; 429/17; 60/780

(58) Field of Classification Search .......... 208/208 R, 208/244, 347; 239/585.1; 422/170, 187, 198, 422/196; 423/650, 437; 429/17, 19, 20, 30; 60/780
See application file for complete search history.

(56) References Cited

U.S. PATENT DOCUMENTS

| | | | | |
|---|---|---|---|---|
| 4,382,851 A | * | 5/1983 | Angevine et al. .............. 208/49 |
| 5,554,454 A | | 9/1996 | Gardner et al. |
| 5,686,196 A | * | 11/1997 | Singh et al. ................... 429/17 |
| 5,958,365 A | | 9/1999 | Liu |
| 5,968,680 A | | 10/1999 | Wolfe et al. |
| 6,217,748 B1 | * | 4/2001 | Hatanaka et al. ........... 208/210 |
| 6,230,494 B1 | | 5/2001 | Botti et al. |
| 6,423,896 B1 | | 7/2002 | Keegan |
| 6,485,852 B1 | | 11/2002 | Miller et al. |
| 6,500,574 B1 | | 12/2002 | Keegan |
| 6,509,113 B1 | | 1/2003 | Keegan |
| 6,551,734 B1 | | 4/2003 | Simpkins et al. |
| 6,562,496 B1 | | 5/2003 | Faville et al. |
| 6,572,837 B1 | * | 6/2003 | Holland et al. ........... 423/648.1 |
| 6,608,463 B1 | | 8/2003 | Kelly et al. |
| 6,609,582 B1 | | 8/2003 | Botti et al. |
| 6,613,468 B1 | | 9/2003 | Simpkins et al. |
| 6,613,469 B1 | | 9/2003 | Keegan |
| 6,620,535 B1 | | 9/2003 | Mukerjee et al. |
| 2002/0029881 A1 | * | 3/2002 | de Rouffignac et al. . 166/244.1 |

FOREIGN PATENT DOCUMENTS

| | | |
|---|---|---|
| GB | 719003 | 11/1954 |
| GB | 1059957 | 2/1967 |
| WO | WO99/61369 | 12/1999 |
| WO | WO01/25140 | 4/2001 |

OTHER PUBLICATIONS http://science.howstuffworks.com/oil–refining.htm/printable.*
http://www.epa.gov/ttn/chief/ap42/ch13/final/c13s05.pdf.*
www.aqmd.gov/ceqa/documents/2001/ nonaqmd/equilon/final/ch5_f.doc.*
European Search Report dated Jan. 23, 2004.

* cited by examiner

*Primary Examiner*—Bruce F. Bell
(74) *Attorney, Agent, or Firm*—Paul L. Marshall

(57) ABSTRACT

A method of using a diesel reforming strategy is disclosed. The method comprises supplying diesel fuel to a fractional distillation device. The diesel fuel is fractionally distilled to produce a light fuel stream and a heavy fuel stream. The light fuel stream is reformed in a reformer to produce a reformate. A method of making an apparatus for a diesel fuel reforming strategy and a method for using a fuel cell system is also disclosed. A fuel cell system for diesel fuel reforming is also disclosed.

19 Claims, 1 Drawing Sheet

DIESEL FUEL REFORMING STRATEGY

BACKGROUND

Alternative transportation fuels have been represented as enablers to reduce toxic emissions in comparison to those generated by conventional fuels. At the same time, tighter emission standards and significant innovation in catalyst formulations and engine controls has led to dramatic improvements in the low emission performance and robustness of gasoline and diesel engine systems. This has certainly reduced the environmental differential between optimized conventional and alternative fuel vehicle systems. However, many technical challenges remain to make the conventionally fueled internal combustion engine a nearly zero emission system having the efficiency necessary to make the vehicle commercially viable.

Alternative fuels cover a wide spectrum of potential environmental benefits, ranging from incremental toxic and carbon dioxide ($CO_2$) emission improvements (reformulated gasoline, alcohols, etc.) to significant toxic and $CO_2$ emission improvements (natural gas, etc.). Hydrogen is clearly the ultimate environmental fuel, with potential as a nearly emission free internal combustion engine fuel (including $CO_2$ if it comes from a non-fossil source).

The automotive industry has made very significant progress in reducing automotive emissions. This has resulted in some added cost and complexity of engine management systems, yet those costs are offset by other advantages of computer controls: increased power density, fuel efficiency, drivability, reliability and real-time diagnostics.

Future initiatives to require zero emission vehicles appear to be taking us into a new regulatory paradigm where asymptotically smaller environmental benefits come at a very large incremental cost. Yet, even an "ultra low emission" certified vehicle can emit high emissions in limited extreme ambient and operating conditions or with failed or degraded components.

One approach to addressing the issue of emissions is the employment of fuel cells. A fuel cell is an energy conversion device that generates electricity and heat by electrochemically combining a gaseous fuel, such as hydrogen, carbon monoxide, or a hydrocarbon, and an oxidant, such as air or oxygen, across an ion-conducting electrolyte. The fuel cell converts chemical energy into electrical energy. A fuel cell generally consists of two electrodes positioned on opposite sides of an electrolyte. The oxidant passes over the oxygen electrode (cathode) while the fuel passes over the fuel electrode (anode), generating electricity, water, and heat. There are several types of fuel cells, including proton exchange membrane (PEM) fuel cells and solid oxide fuel cells (SOFC).

In a SOFC, a fuel flows to the anode where it is oxidized by oxygen ions from the electrolyte, producing electrons that are released to the external circuit, and producing mostly water and carbon dioxide that are removed in the fuel flow stream. At the cathode, the oxidant accepts electrons from the external circuit to form oxygen ions. The oxygen ions migrate across the electrolyte to the anode. The flow of electrons through the external circuit provides for consumable or storable electricity. However, each individual electrochemical cell generates a relatively small voltage. Higher voltages are attained by electrically connecting a plurality of electrochemical cells in series to form a stack.

Using conventional fuels (i.e., gasoline, diesel) within a fuel cell damages the fuel cell from the deposition of carbon (or soot). Therefore, typical fuel sources for fuel cells are reformates, i.e., a form of purified hydrogen produced from a hydrocarbon fuel processed in a reformer. Three types of reformer technologies are typically employed (steam reformers, dry reformers, and partial oxidation reformers) to convert hydrocarbon fuel (methane, propane, natural gas, gasoline, etc) to hydrogen using water, carbon dioxide, and oxygen, respectively, with byproducts including carbon dioxide and carbon monoxide, accordingly. These reformers operate at high temperatures (e.g., about 800° C. or greater). Under steam reforming, an alcohol, such as methanol or ethanol, or a hydrocarbon, such as methane, gasoline or propane, is reacted with steam over a catalyst. Steam reforming requires elevated temperatures and produces primarily hydrogen and carbon dioxide. Some trace quantities of unreacted reactants and trace quantities of byproducts such as carbon monoxide also result from steam reforming.

Reforming of a fuel generally involves the conversion of a hydrocarbon fuel into separate components, such as hydrogen, carbon monoxide, and carbon dioxide. Generally, lighter hydrocarbons such as methane, ethane, and gasoline more easily reformed. Heavier hydrocarbon fuels, such as diesel, are inherently more difficult to reform because of its tendency to partially decompose prior to full vaporization. Thus, the amount of hydrogen or carbon monoxide recoverable is less than lighter hydrocarbon fuels. Also, diesel fuel is high in sulfur content, which may poison a fuel cell or result in pollution due to the production of sulfur oxides.

SUMMARY

The drawbacks and disadvantages of the prior art are overcome by the diesel fuel reforming strategy.

A method of using a diesel reforming strategy is disclosed. The method comprises supplying diesel fuel to a fractional distillation device. The diesel fuel is fractionally distilled to produce a light fuel stream and a heavy fuel stream. The light fuel stream is reformed in a reformer to produce a reformate.

A diesel fuel reforming system is also disclosed. The diesel fuel reforming system comprises a fractional distillation device in fluid communication with a supply of diesel fuel. A reformer is in fluid communication with the fractional distillation device. A fuel cell stack is in fluid communication with the reformer.

A method of making an apparatus for a diesel reforming strategy is disclosed. The method comprises a reformer in fluid communication with a fuel cell stack, the reformer in fluid communication with a fractional distillation device, and the fractional distillation device in fluid communication with a supply of diesel fuel.

A method of using a fuel cell system is disclosed. The method comprises supplying diesel fuel to a fractional distillation device. The diesel fuel is fractionally distilled to produce a light fuel stream and a heavy fuel stream. The light fuel stream is reformed in a reformer to produce a reformate. The reformate is utilized in a fuel cell stack to produce electricity.

A fuel cell system for diesel fuel reforming is also disclosed. The system comprises a means for fractionally distilling a supply of diesel fuel to produce a light fuel stream and a heavy fuel stream. A means for reforming the light fuel stream is utilized to produce a reformate, such that the means for reforming is disposed in fluid communication with the means for fractionally distilling. A means for producing electricity from the reformate is disposed in fluid communication with the means for reforming.

The above described and other features are exemplified by the following figures and detailed description.

BRIEF DESCRIPTION OF THE DRAWINGS

Referring now to the FIGURE, which is meant to be exemplary not limiting.

DETAILED DESCRIPTION

Figure 1:
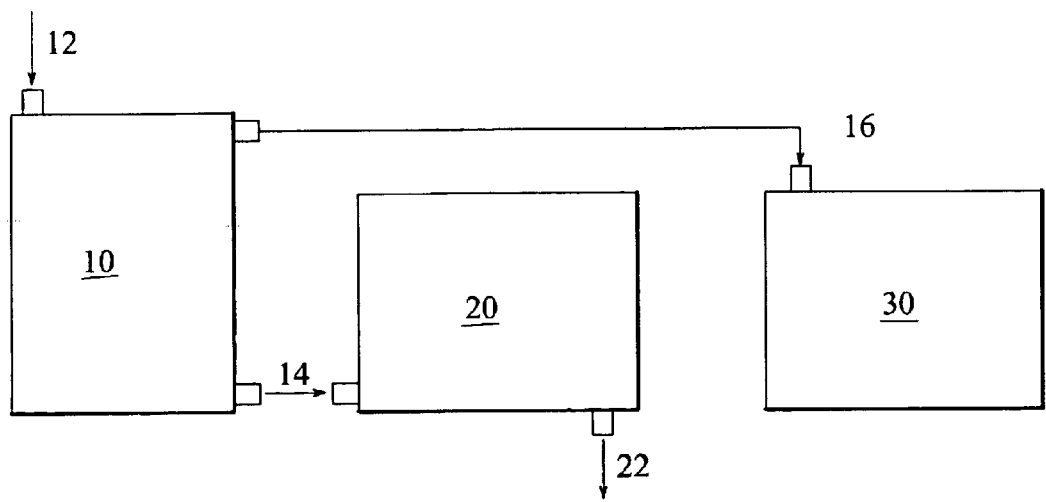
FIG. 1 is a perspective view of an exemplary diesel fuel reforming strategy.

A fuel cell system may be utilized with an engine to operate a vehicle. The power created from the engine and the fuel cell can propel a vehicle, as well as providing electricity and heat for the auxiliary systems. To create this power, a fuel cell needs to be supplied with a fuel. Generally, lightweight fuels are supplied to a reformer to create a fuel usable in the fuel cell (commonly known as a "reformate"). To prepare a reformate from diesel fuel, the diesel fuel can be fractionally distilled to produce a stable light fuel vapor stream and a heavy fuel stream. The light fuel vapor stream is then processed in a reformer to produce a reformate suitable for use in a fuel cell. The diesel reforming strategy for a fuel cell system described herein is for any fuel cell system, including SOFC systems and PEM fuel cell systems.

Referring to FIG. 1, the apparatus for preparing a reformate from diesel fuel comprises a fractional distillation device 10 and a reformer 20. The fractional distillation device 10 distills a fuel 12, such as diesel, into a light fuel vapor stream 14 and a heavy fuel stream 16. A reformer 20 produces a reformate 22, such that the reformer 20 is adapted to receive the light fuel vapor stream 14. Possible fuels which can be processed include commercial diesel fuels, military diesel fuels, blended diesel fuels containing a larger than normal "light end"(for example diesel blended with naphtha, kerosene, or methanol), and similar fuels.

During use, the diesel fuel would be introduced to the fractional distillation apparatus where the components of different boiling points are separated from a liquid mixture by heating the diesel fuel and vaporizing the liquid. The vapor is then passed through a fractionating column. Fractional distillation can be carried out by methods well known in the art.

To achieve a fuel stream capable of being directed to the reformer of a fuel cell system, the supply of diesel fuel is fractionally distilled. The diesel fuel is heated to a temperature sufficient to induce boiling, e.g., for some diesel fuels, to a temperature of about 260° C. The diesel fuel can be heated electrically, e.g., with heat exchange coils or by the flow of heated oil, coolant, process gases, or the like. The heated diesel fuel boils, resulting in liquids and vapors discharged into towers that separate the liquids and vapors into fractions according to their weight and boiling points. The lighter fractions vaporize and rise to the top of the tower, where the fractions condense back to liquids and are captured, while the heavier weight fractions settle towards the bottom of the tower. Diesel fuel is comprised of compounds having a carbon number of about $C_8$ to about $C_{20}$. Upon fractional distillation, the distillate containing the light fuel vapor fraction (or light fuel stream) 14, generally comprises stable fuel vapors of the more volatile compounds having a carbon number of less than about $C_{14}$ and has boiling points of less than about 250° C. Approximately two-thirds of the diesel fuel boiled becomes the light fuel stream (i.e., a light diesel fuel). The distillate containing the heavy fuel fraction (or heavy fuel stream) 16, generally comprises compounds having a carbon number of greater than about $C_{15}$ and has a boiling point of greater than about 250° C. Approximately one-third of the diesel fuel boiled remains as the heavy fuel stream. The heavy fuel stream 16 can be directed to a burner 30 for generating heat input for the use by the reformer 20 and other vehicle components, while the light fuel vapor stream 14 can be directed to the reformer 20 for processing into a reformate 22.

Once the diesel fuel attains boiling temperature, the diesel fuel preferably remains boiling for a continuous supply of light fuel to be supplied to the downstream device or reformer. The light fuel vapor stream 14 can be processed in a reformer 20 that utilizes a steam reforming, a partial oxidation, or dry reforming process to produce a reformate 22, with a steam reforming process preferred. Steam reforming systems use a light fuel stream and steam ($H_2O$) that is reacted in heated tubes filled with catalysts to convert the hydrocarbons into principally hydrogen and carbon monoxide. An example of the steam reforming reaction using methane as the fuel is as follows:

$$CH_4 + H_2O \rightarrow CO + 3H_2$$

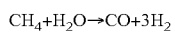

Partial oxidation reformers are based on substoichiometric combustion to achieve the temperatures necessary to reform the hydrocarbon fuel. Decomposition of the fuel to primarily hydrogen and carbon monoxide occurs through thermal reactions at high temperatures of about 700° C. to about 1,000° C. The heat required to drive the reaction is typically supplied by burning a portion of the fuel. Catalysts have been used with partial oxidation systems (catalytic partial oxidation) to promote conversion of various low sulfur fuels into synthesis gas. The use of a catalyst can result in acceleration of the reforming reactions and can provide this effect at lower reaction temperatures than those that would otherwise be required in the absence of a catalyst. An example of the partial oxidation reforming reaction is as follows:

$$CH_4 + \tfrac{1}{2}O_2 \rightarrow CO + 2H_2$$

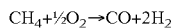

Dry reforming involves the creation of hydrogen and carbon monoxide in the absence of water, for example using carbon dioxide. An example of the dry reforming reaction is depicted in the following reaction:

$$CH_4 + CO_2 \rightarrow 2CO + 2H_2$$

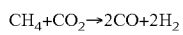

Both steam reforming and dry reforming are endothermic processes, while partial oxidation is an exothermic process. A SOFC will utilize the hydrogen (i.e., reformats) and carbon monoxide (CO) as a fuel.

One advantage to this distillation process is the ability to use commercial or military diesel fuels. These fuels are generally difficult to reform because of the tendency for the fuels to partially decompose prior to full vaporization. The fact that these fuels often have a high sulfur concentration is a further problem with the use in a fuel cell since sulfur is a fuel cell poison. However, this process reforms the lighter portion of the diesel fuel, removes at least some, and preferably all, of the sulfur, and optionally utilizes the heavy fuel to heat various system components.

Commercial diesel fuels tend to be hydro-treated and, consequentially, the light fuel vapor stream from the distilled hydro-treated diesel fuel can have even lower concentrations of sulfur, compared to non-hydrotreated diesel fuel. Consequently, it is ideal to use hydrotreated commercial fuels with a fuel cell since sulfur can poison a fuel cell. Yet, the employment of the fractional distillation process enables the use of a variety of fuels including non-hydrotreated diesel fuels, which may be more readily available in third world countries.

When fractionally distilling commercial diesel fuels, the distilled reformate available to the fuel cell is inherently lower in sulfur compared to an approach where all of the fuel passes through the anode. Additionally, other contaminants, such as organometallic compounds and polyaromatic hydrocarbons, are also present in commercial fuels and can foul a fuel cell. By distilling the diesel fuel into a light fuel stream and a heavy fuel stream, these contaminants are similarly removed via the heavy fuel stream. This method of reforming heavier hydrocarbon fuels allows for the full mixing of air and or steam reactants and is much less prone to sooting and deterioration of the fuel cell catalysts.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of reforming diesel fuel, comprising:
   supplying a liquid fuel consisting essentially of diesel fuel to a fractional distillation device in fluid communication with a reformer;
   fractionally distilling said diesel fuel to produce a light fuel stream and a heavy fuel stream; and
   reforming said light fuel stream in said reformer to produce a reformate.

2. The method of claim 1, further comprising burning said heavy fuel stream in a burner to generate thermal energy.

3. The method of claim 2, further comprising the step of using the thermal energy in a vehicle component.

4. The method of claim 3, wherein the vehicle component is the reformer.

5. The method of claim 1, wherein said diesel fuel comprises hydro-treated diesel fuel.

6. The method of claim 1, wherein said reformer comprises an endothermic reformer.

7. The method of claim 6, wherein said reformer comprises a steam reformer.

8. The method of claim 1, further comprising the step of providing the reformate to a solid oxide fuel cell to produce electricity.

9. The method of claim 1, wherein said reformate comprises synthesis gas.

10. The method of claim 1, wherein the light fuel stream comprises compounds having a carbon number of less than about $C_{14}$, and wherein the heavy fuel stream comprises compounds having a carbon number of greater than about $C_{15}$.

11. A method of reforming diesel fuel, comprising:
    supplying a liquid fuel consisting essentially of diesel fuel to a fractional distillation device in fluid communication with a reformer;
    fractionally distilling said diesel fuel to produce a light fuel stream and a heavy fuel stream; and
    reforming said light fuel stream in said reformer to produce synthesis gas.

12. The method of claim 11, further comprising burning said heavy fuel stream in a burner to generate thermal energy.

13. The method of claim 12, further comprising the step of using the thermal energy in a vehicle component.

14. The method of claim 13, wherein the vehicle component is the reformer.

15. The method of claim 11, wherein said diesel fuel comprises hydro-treated diesel fuel.

16. The method of claim 11, wherein said reformer comprises an endothermic reformer.

17. The method of claim 16, wherein said reformer comprises a steam reformer.

18. The method of claim 11, further comprising the step of providing the synthesis gas to a solid oxide fuel cell to produce electricity.

19. The method of claim 11, wherein the light fuel stream comprises compounds having a carbon number of less than about $C_{14}$, and wherein the heavy fuel stream comprises compounds having a carbon number of greater than about $C_{15}$.

* * * * *